April 7, 1953  R. E. MEAGHER  2,634,412
REMOTE POSITION MARKER
Filed Sept. 14, 1945  2 SHEETS—SHEET 2

INVENTOR
RALPH E. MEAGHER
BY Ralph Chappell
ATTORNEY

Patented Apr. 7, 1953

2,634,412

UNITED STATES PATENT OFFICE 2,634,412

REMOTE POSITION MARKER

Ralph E. Meagher, Watertown, Mass., assignor, by mesne assignments, to the United States of America as represented by the Secretary of the Navy Application September 14, 1945, Serial No. 616,394

7 Claims. (Cl. 343—7.0)

This invention relates to apparatus for aiding in the alignment in azimuth and range of a remote object detector with respect to a second object detector, and more particularly to apparatus which produces an illuminated trace on the indicator of the second object detector when the remote object detector is aligned therewith in azimuth, the length of the trace being an indication of the range setting of the remote object detector.

It is an object of this invention to provide apparatus to aid in the alignment of a remote auxiliary object detector with respect to another object detector in either azimuth or range or both.

It is a further object of this invention to provide apparatus to indicate when a remote auxiliary object detector is aligned with respect to another object detector in either azimuth or range or both.

It is a further object of this invention to provide apparatus to indicate the range setting of a remote auxiliary object detector on the indicator of another object detector or on a repeater indicator of this latter object detector.

It is a further object of this invention to provide apparatus to aid a remote object detector in locating a target detected by another object detector.

Other and further objects will appear during the course of the following description.

In the use of object detectors, such as those where an electromagnetic wave of high frequency or a supersonic wave is transmitted and the reflection from an object to be detected picked up on suitable receiving apparatus to give an indication of the azimuth and range of the object, it is frequently desired to align in azimuth and range a remote auxiliary object detector with the first detector or with a target detected by the first detector. A case where this situation may arise is on ship board where an object detector used in searching has located an object in the course of its search, and it is desired to train another object detector used in the laying of guns on this object for use as a target. Gun laying object detectors require for accuracy very sensitive adjustments of their azimuth and range. Accordingly, difficulty may be encountered in training this gun laying detector on its target, particularly where great speed is required. Synchro systems and servomechanisms adaptable for accomplishing such accurate gun laying are described generally in chapter 12 of "Principles of Radar," by the staff of the M. I. T. Radar School, The Technology Press, Massachusetts Institute of Technology, Cambridge, Massachusetts, 1944.

With the present invention apparatus is provided which illuminates the plan position indicator scope of the search object detector, or of a repeater of this detector, with a trace when this detector and a remote object detector are aligned in azimuth. This trace will correspond to the azimuth bearing of the search detector. The apparatus of the present invention also adjusts the length of this trace in accordance with the range setting of the auxiliary detector. An operator stationed at the indicator scope of the search object detector or of its repeater communicates with the operator of the auxiliary detector the corrections necessary to align the two detectors in azimuth and range.

Reference is now had to the accompanying drawing where:

Figure 1:
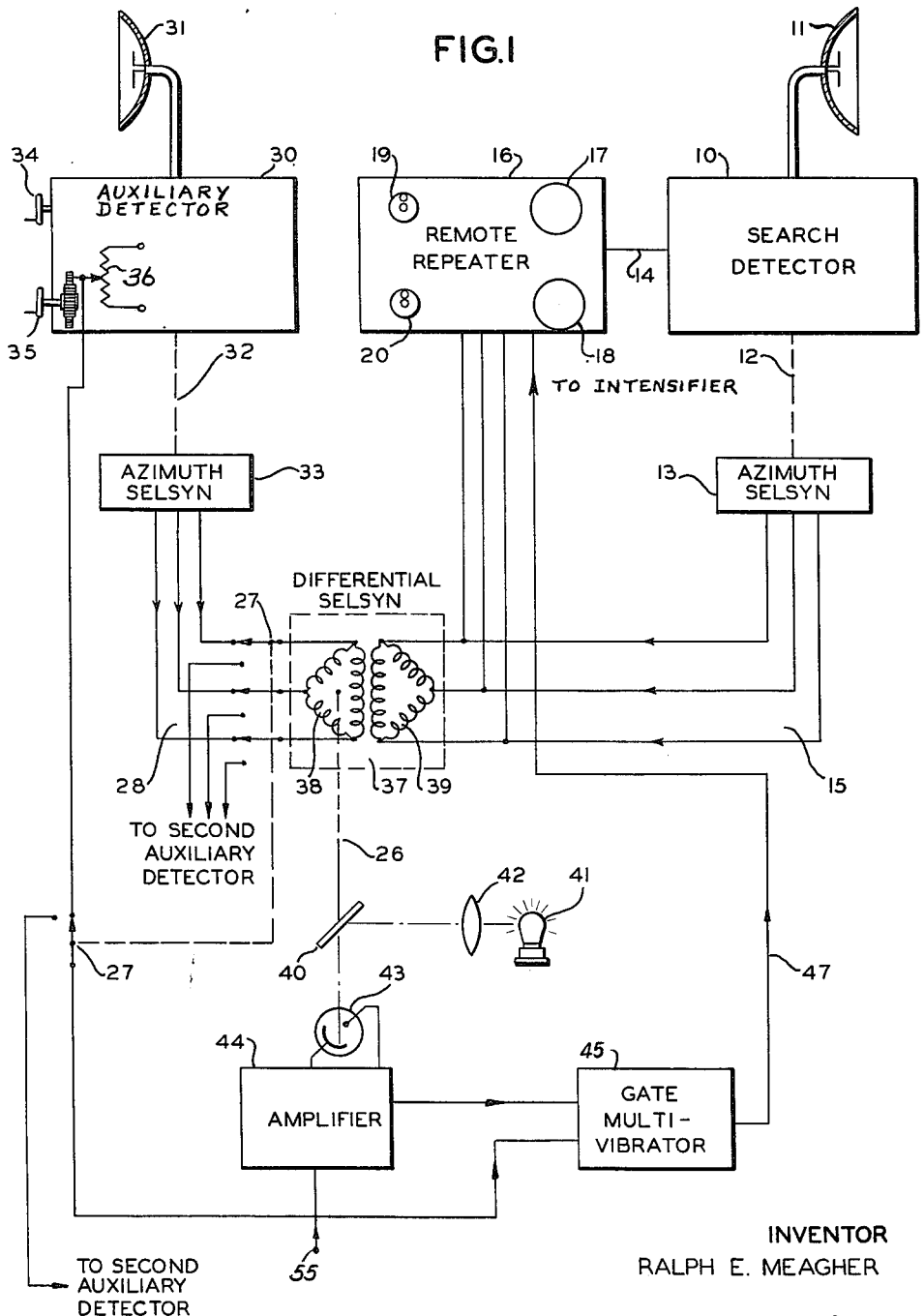
Fig. 1 is in general a block diagram of the invention.

In the diagram of Fig. 1 a search remote object detector 10 transmits a pulse of high frequency energy from antenna 11 rotatable in azimuth. The reflected energy from a target is picked up by antenna 11 and after detection is transmitted over path 14 to a remote repeater 16 where it is displayed on cathode ray scopes 17 and 18 therein. Antenna 11 is mechanically connected to an azimuth selsyn 13 through linkage 12. The output of this selsyn is transmitted over the conventional three wire path 15 to a selsyn in remote repeater 16 to synchronize in azimuth this repeater with antenna 11. It may be noted with regard to these selsyns that the conventional two wire power supply has been omitted for purposes of simplification. Thus the energy transmitted over path 14 will appear on scopes 17 and 18 in its proper azimuth and range. Range handwheel 19 and azimuth handwheel 20 are used to aid in the reading of the range and azimuth of the data appearing on scopes 17 and 18.

An auxiliary remote object detector 30 is remotely spaced from remote repeater 16 and search detector 10. Detector 30 is provided as is detector 10 with an antenna 31 rotatable in azimuth. An azimuth selsyn 33 is mechanically connected to the antenna through linkage 32. Detector 30 is provided with handwheels 34 and 35 which are rotatable to control the azimuth of antenna 31 and the range setting, respectively.

The output of azimuth selsyn 33 is fed over the conventional three wire path 28 to rotor 38 of differential selsyn 37. The output of azimuth selsyn 13 is branched from path 15 and fed to stator 39 of selsyn 37. The shaft of rotor 38 is connected through linkage 26 to a reflecting mirror 40 which rotates in synchronism with the shaft. When the inputs to differential selsyn 37 are in the same phase relationship, which corresponds to an alignment of antennas 11 and 31 in azimuth, the rotor shaft will have a fixed angular position. When the phase relationships are different the shaft assumes an angular position corresponding to the magnitude of this difference. Thus the angular position of the shaft is a measure of the phase relationships between the two inputs to the differential generator.

A light 41 projects its beam through lens 42 towards mirror 40. With mirror 40 in one angular position this beam is then reflected to photoelectric cell 43. Mirror 40 is angularly adjusted with respect to the shaft of linkage 33 so that the beam of light will fall on cell 43 when the two inputs to differential selsyn 37 are in the same phase relationship, which occurs when the axes of directivity of antennas 11 and 31 are aligned in azimuth.

Amplifier 44 and gate multivibrator 45 are generally included within remote repeater 16, but are shown as separate blocks for clarity. These are described in more detail in connection with Fig. 2, and their function is only broadly discussed here. A portion of the transmitter pulse of search detector 10 is applied at terminal 55. Photoelectric cell 43 when rendered conducting sensitizes an amplifier tube in amplifier 44 to which the transmitter pulse is applied, so that the pulse is passed through the amplifier into gate multivibrator 45. This pulse triggers the multivibrator to produce repetitive rectangular waves ("gates") in synchronism with the transmitter pulse. The duration of each "gate" is determined by certain circuit constants of the multivibrator. This wave is applied over path 47 to the intensifier grid of plan position indicator scope 18 of remote repeater 16 to produce an illuminated radial trace thereon. The trace will occur only when antennas 11 and 31 are aligned in azimuth and be of a length determined by gate multivibrator 45. The angular position of the trace will correspond in azimuth to antenna 11. It may be noted that scope 17 is operative to give any desired presentation, for example, the so-called "B" type where a sector of the azimuth is presented in the horizontal dimension and the range is presented in the vertical dimension.

As previously stated, auxiliary detector 30 is provided with an azimuth handwheel 34 and a range marker handwheel 35. Range handwheel 35 controls a potentiometer 36, which is connected in circuit with other circuit constants of gate multivibrator 45 over path 29. This potentiometer thus controls the length of the radial trace appearing on scope 18.

When it is desired to align detector 30 with a target detected by detector 10, which target appears as an arcuate trace on scope 18, an operator is stationed at remote repeater 16. A second operator is stationed at the auxiliary detector 30 and controls the azimuth and range setting of this detector by rotating handwheels 34 and 35, respectively. The first operator at the remote repeater, where the arcuate target trace is visible on scope 18, watches for the radial trace to appear, notes the angular displacement between the radial trace and the target trace, and informs the second operator stationed at the auxiliary detector over suitable communication means of the necessary azimuth adjustment of the auxiliary detector to train it on the target. The range of the target is known to the first operator, it being the distance of the target trace from the center of scope 18, and the length of the radial trace is an indication of the range setting of the auxiliary detector. It follows that it is only necessary for the first operator to inform the second operator of the necessary adjustments of range handwheel 35 to bring the auxiliary detector to proper range, which occurs when the radial trace extends out to the target trace on scope 18. This provides a fast and accurate method of aligning the two detectors in azimuth and range. Remote repeater 16 may be so positioned that scope 18 is visible to the second operator. This eliminates the necessity of the first operator.

It may be desired to direct several auxiliary detectors on the same or different targets as detected by the search detector. This is likely to arise in connection with gun laying where each auxiliary detector directs a particular group of guns. A selector switch 27 may be provided in paths 28 and 29 to permit other auxiliary detectors to be substituted for alignment with the search detector. This enables the operator at remote repeater 16 to systematically allocate targets to the auxiliary detectors used in gun laying in any desired order simply by switching the connections of selector switch 27.

Figure 2:
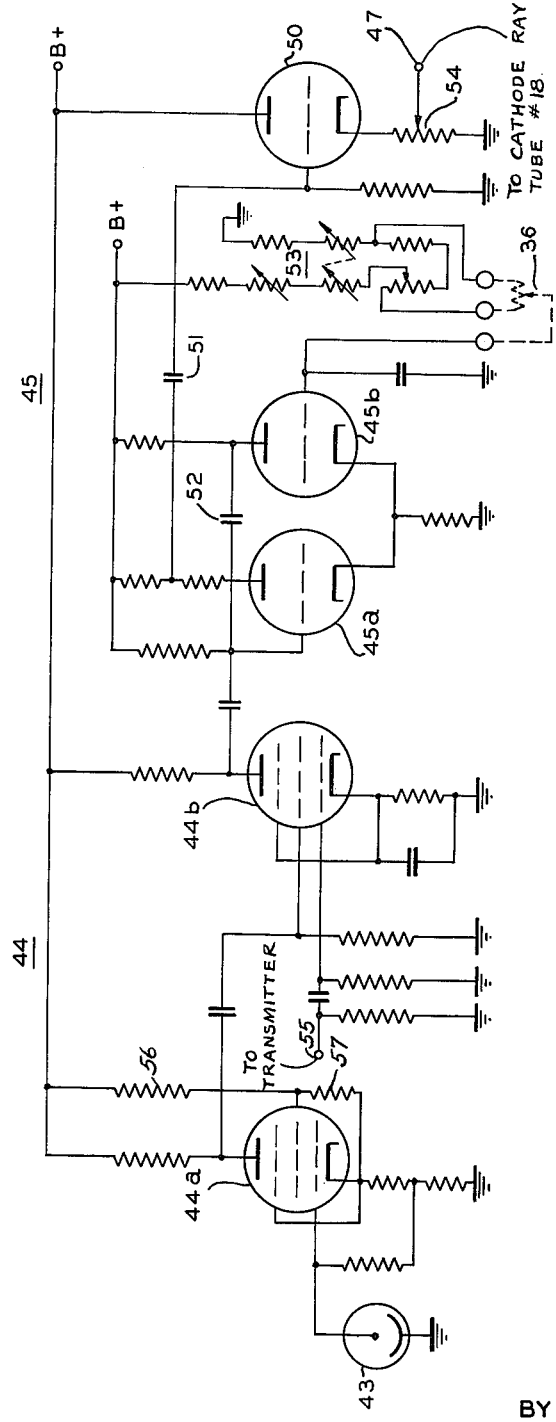
Fig. 2 is a circuit diagram showing details of certain portions of Fig. 1.

Referring now to Fig. 2 where generally a circuit diagram of amplifier 44 and gate multivibrator 45 are disclosed. Photoelectric cell 43 is connected between the control grid of tube 44a and ground. Tube 44a is normally conducting. Its cathode is positively biased due to its plate current and the current in resistors 56 and 57 flowing through the cathode resistors. The control grid is normally at a potential below that of the cathode, but above cut-off. When photoelectric cell 43 is activated by the reflected light beam from mirror 40, the control grid is effectively substantially grounded to cut off tube 44a. This results in a positive trigger voltage being applied to the screen of amplifier tube 44b. A portion of the transmitter pulse is applied at terminal 55 and hence to the grid of amplifier tube 44b. The screen of 44b is normally at or near ground potential so that practically no plate current passes through to the plate of 44b, regardless of the grid potential.

Tubes 45a and 45b of multivibrator 45 are biased by the associated resistors and plate voltage to be normally conducting and non-conducting, respectively. The weak negative output pulses appearing at the plate of amplifier tube 44b due to the impulses received at the grid are normally of insufficient magnitude to drive the grid of tube 45a below cut-off. When the photoelectric cell becomes conducting however, tube 44a goes toward cut-off, applying a positive voltage to the screen of 44b so that it conducts, amplifying the pulse applied to its grid, giving an output pulse amply large to trigger the multivibrator. The plate resistor of tube 45a is tapped and connected to the grid of a cathode follower tube 50 over path 51. When tube 45a is cut-off a positive pulse is impressed on the grid of cathode follower 50. Condenser 52 then begins to charge, and the grid of tube 45a begins to rise towards the cut-off value rendering this tube once more conducting. The rate of charge and consequently the time tube 45a is cut-off is determined by the voltage at the plate of tube 45b during this time. This voltage is controlled by the grid bias of tube 45b during this time. A generally variable group of resistors 53 in conjunction with potentiometer 36 located in auxiliary detector 30 control this grid bias. It is thus seen that after preliminary adjustment of resistor group 53 the duration of the positive pulse impressed on the grid of cathode follower 50 is controlled by adjustment of potentiometer 36 in auxiliary detector 30. The output pulse of cathode follower 50 is connected through path 47 to the intensifier grid of scope 18. Potentiometer 54 is provided to control the brilliance of the trace appearing on scope 18 due to this output pulse of cathode follower 50. This intensifier grid is biased by another conventional blanking circuit (not shown) during the sweep period to a value slightly below that required to illuminate the scope, and the output wave of cathode follower 50 is sufficient to illuminate the trace of this scope during the occurrence of this wave. This illuminated trace will extend from the center outwardly a distance depending on the adjustment of potentiometer 36.

As long as the antennas remain in alignment the plate voltage of tube 44a will remain at its upper limit, and except for the slow discharge of the coupling condenser from its plate to the screen of tube 44b, will maintain the screen of tube 44b at a conducting level. Tube 45a of multivibrator 45 is always in the condition to be triggered whenever the amplified transmitter pulse reaches its grid. Hence, whenever the antennas come into alignment, rectangular pulses are produced in synchronism with the transmitter pulses of the search detector, and the illuminated trace will appear on scope 18.

Figure 3:
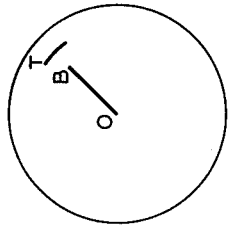
Fig. 3 is a view of the screen of a cathode ray tube under operating conditions.

In Fig. 3 the illuminated trace is shown as line OB. In the condition shown the search detector antenna is trained on a target T, and the auxiliary detector antenna is aligned therewith to produce trace OB. The length OB furnishes an indication of the range setting of the auxiliary detector, and under the conditions shown the range setting of the auxiliary detector is less than the target range by a distance BT.

Numerous additional applications of the above-disclosed principles will occur to those skilled in the art and no attempt has been made to exhaust such possibilities. The scope of the invention is defined in the following claims.

I claim:

1. In combination, a search detector having a rotatable antenna, an auxiliary detector also having a rotatable antenna, a cathode ray scope for presenting data collected by said search detector, azimuth selsyns mechanically connected to each of said antennas and rotatable therewith, a differential selsyn having its rotor and stator connected respectively to the outputs of said azimuth selsyns, a photoelectric cell, a mirror mounted on the shaft of said rotor and so positioned thereon to reflect a beam from a light source on and activate said photoelectric cell when the antennas of said search and auxiliary detectors are aligned, a gate multivibrator for producing a rectangular wave in response to activation of said photoelectric cell and being so connected to said cathode ray scope that said wave will appear as an illuminated trace thereon and thereby furnish an indication when said antennas are aligned.

2. In combination, a search detector having an antenna rotatable in azimuth, a cathode ray scope for presenting data collected by said search detector, handwheels for determining the azimuth and range of a target the trace of whose echo picked up by said antenna appears on said cathode ray scope, an auxiliary detector having an antenna rotatable in azimuth and handwheels for rotating said last mentioned antenna and setting the range searched by said auxiliary detector, a first azimuth selsyn mechanically connected to one of said antennas and rotatable therewith, a second azimuth selsyn connected to the other of said antennas and rotatable therewith, a differential selsyn having rotor and stator respectively connected to the outputs of said azimuth selsyns, a photoelectric cell, a mirror mounted on the shaft of said rotor and angularly positioned thereon to reflect a beam from light source on and activate said photoelectric cell when the antennas of said search and auxiliary detectors are aligned in azimuth, a gate multivibrator for producing a rectangular wave in response to activation of said photoelectric cell, the output of said multivibrator being connected to the intensifying grid of said scope to produce an illuminated trace when said antennas are aligned in azimuth, a potentiometer adjustable with the range handwheel of said auxiliary detector and so connected to said multivibrator as to control the duration of said rectangular wave, whereby the length of the illuminated trace on said scope will indicate the range being searched by said auxiliary detector.

3. In combination, a first search detector having a rotatable antenna, a second detector also having a rotatable antenna, a differential selsyn actuated by said rotatable antennas, a voltage generator responsive to said differential selsyn, a multivibrator for producing a rectangular voltage pulse in response to voltages from said voltage generator, and a cathode ray tube connected to said multivibrator for furnishing an indication of alignment in azimuth of said rotatable antennas.

4. In combination, first and second search detectors each having a rotatable antenna, azimuth selsyns mechanically connected to each of said antennas and rotatable therewith, a differential selsyn having its rotor and stator connected respectively to the outputs of said azimuth selsyns, means associated with the shaft of said differential selsyn for generating a signal in response to azimuth alignment of said antennas and means for converting said signal into a visual indication.

5. In combination, first and second search detectors each having a rotatable antenna, said first search detector including adjustable means for selecting a particular range sector, azimuth selsyns mechanically connected to each of said antennas and rotatable therewith, a differential selsyn having its rotor and stator connected respectively to the outputs of said azimuth selsyns, means associated with the shaft of said differential selsyn for generating a signal in response to alignment in azimuth of said antennas, means for converting said signal into a visual indication, and means associated with said adjustable means of said first detector for altering said visual indication to indicate the setting of said adjustable means.

6. In combination, first and second search detectors each having a rotatable antenna, a cathode ray tube indicator for presenting data collected by said first search detector, azimuth selsyns mechanically connected to each of said antennas and rotatable therewith, a differential selsyn having its rotor and stator connected respectively to the outputs of said azimuth selsyns, a photoelectric cell, a mirror mounted on the shaft of said rotor and so positioned thereon to reflect a beam from a light source on said photoelectric cell in response to the azimuth alignment of said first and second search detectors, and means associated with said photoelectric cell and said indicator for producing an indication on said indicator in response to the illumination of said photoelectric cell by said light beam.

7. A target allocating system comprising a first pulse echo search detector having a rotatable directional antenna, a cathode ray tube display device responsive to said detector for presenting a polar plot of all targets within the effective search area of said detector, a second pulse echo search detector remote from said first detector and having a directional antenna, means for rotating said second antenna, means for indicating on said display device azimuth alignment of said antennas whereby the second antenna may be directed to a preselected target appearing on said plot and means at said second detector for adjusting said azimuth alignment indication to provide an indication at said second detector of the range of said preselected target.

RALPH E. MEAGHER.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,312,203 | Wallace | Feb. 23, 1943 |
| 2,463,476 | Busignies | Mar. 1, 1949 |
| 2,510,692 | Goddard | June 6, 1950 |
| 2,537,102 | Stokes | Jan. 9, 1951 |